May 7, 1963   J. S. HAWKES   3,088,775
TIRE AND WHEEL ASSEMBLY
Filed April 19, 1961   3 Sheets-Sheet 1

INVENTOR.
JOSEPH S. HAWKES

BY  J. B. Holden
ATTORNEY

May 7, 1963  J. S. HAWKES  3,088,775
TIRE AND WHEEL ASSEMBLY
Filed April 19, 1961  3 Sheets-Sheet 2

INVENTOR.
JOSEPH S. HAWKES
BY
J. B. Holden
ATTORNEY

May 7, 1963  J. S. HAWKES  3,088,775
TIRE AND WHEEL ASSEMBLY
Filed April 19, 1961  3 Sheets-Sheet 3

INVENTOR.
JOSEPH S. HAWKES
BY
ATTORNEY

United States Patent Office 3,088,775
Patented May 7, 1963

3,088,775
TIRE AND WHEEL ASSEMBLY
Joseph S. Hawkes, Silver Lake, Cuyahoga Falls, Ohio, assignor to The Goodyear Tire & Rubber Company, Akron, Ohio, a corporation of Ohio
Filed Apr. 19, 1961, Ser. No. 104,153
11 Claims. (Cl. 301—55)

This invention relates to a tire and wheel assembly and more particularly to such an assembly that is light in weight yet will carry relatively large loads.

The size of special purpose tires has materially increased over the years due to the increased vehicle size and work demands for such types of vehicles but in most instances, the tires and wheels for these purposes have been basically only enlargements of the existing structures with the necessary modifications. In this practice, the natural result has been a proportional increase in weights and costs resulting in a very heavy and expensive tire and wheel assembly. At best, available manufacturing equipment limitations have placed practical ceilings on any substantial expansion of the production of larger wheel and tire assemblies. In addition, the transportation presently available for larger assemblies is practically non-existent not only because of carrier vehicle size but also road or track facilities.

In many fields such as desert, swamp or marsh, arctic and possibly, space exploration work, the surfaces over which a vehicle must move are of such a nature that a large size, extremely light in weight, high flotation tire is essential. Not only must the weight be at a minimum but also the power to move the vehicle over the terrain. A large diameter, large cross section tire of high strength fabric mounted on a wheel formed primarily of structural elements that are under tension at all times during normal operating conditions will provide a remarkably stable, high load carrying, high flotation tire and wheel that is well adapted for such special operations. In such a structure, a rim is not necessary thus introducing a substantial weight saving and in addition, increasing materially the ability of the tire to absorb impacts and the degree of collapsibility when not in use. In addition, such a tire and wheel assembly can be collapsed to a relatively small package for transporting then subsequently assembled at the job site with no particular difficulty. It is, therefore, an object of this invention to provide a new and novel tire and wheel assembly.

A further object of the invention is to provide a light weight, high load carrying tire and wheel;

Another object of the invention is to provide a large size tire and wheel that is readily collapsible to a much smaller package;

A still further object of the invention is to provide a tire and wheel that will readily move over soft surfaces with relatively lower power.

Still another object of the invention is to provide a tire and wheel structure in which substantially all of the elements of the structure are subject to tension as all times.

Other objects and advantages of this invention will become apparent hereinafter as the description thereof proceeds, the novel features, arrangements and combinations being clearly pointed out in the specification as well as the claims thereunto appended.

Figure 1:
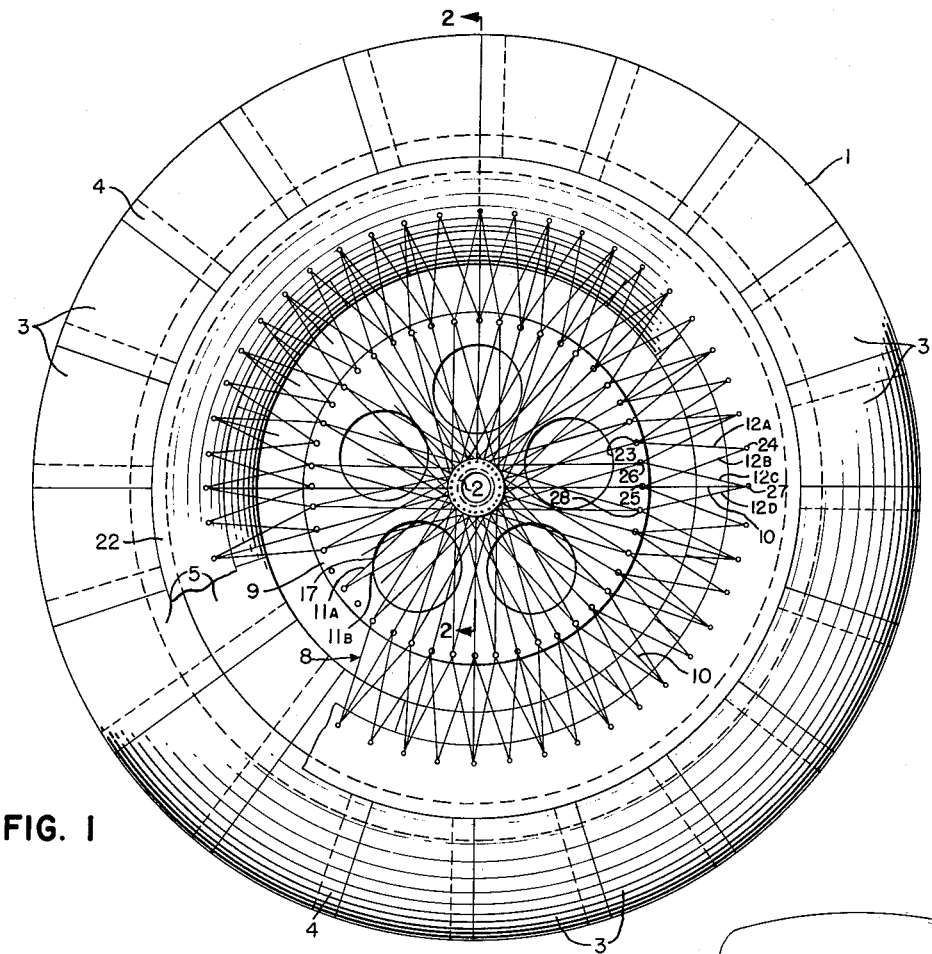
FIG. 1 is a view of a tire and wheel assembly of the invention.
Figure 5:
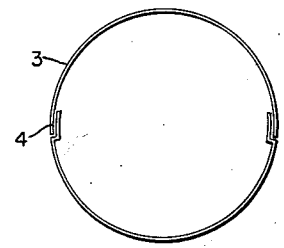
FIG. 5 is a diagrammatic sketch illustrating another tire construction.
Figure 2:
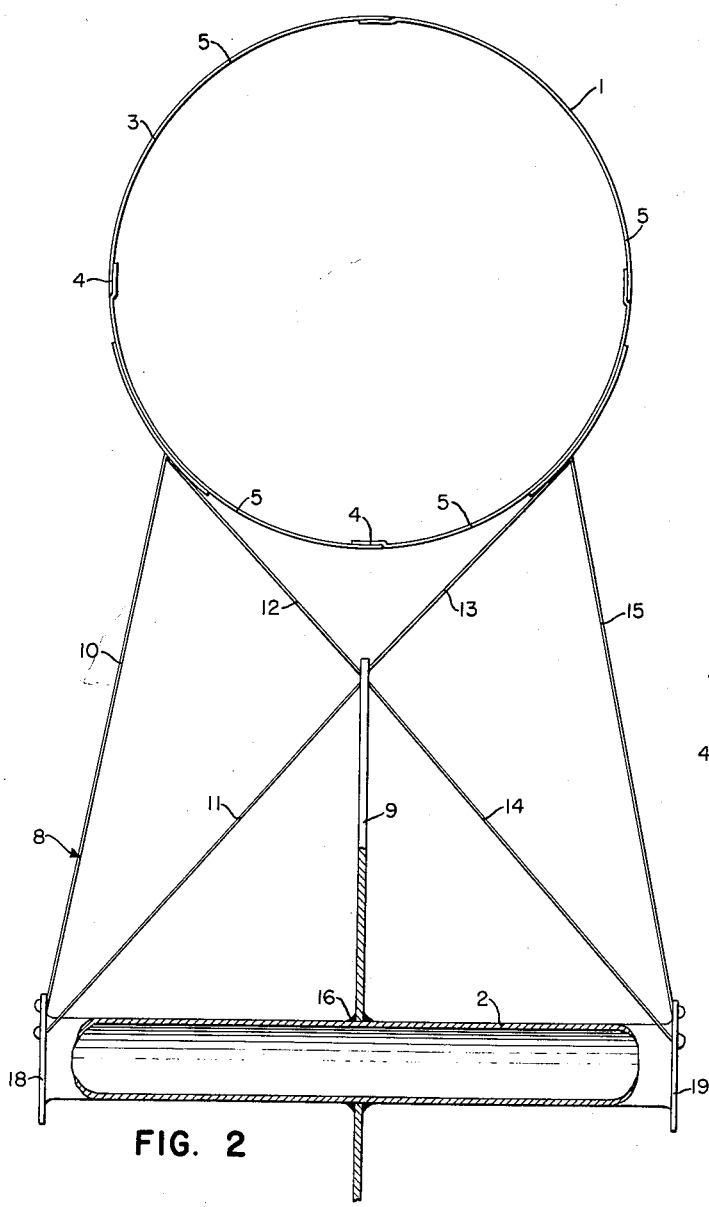
FIG. 2 is a sectional view taken on line 2—2 of FIG. 1.

In FIGS. 1 and 2, the annular tire represented by the numeral 1 is concentrically mounted around a wheel or hub 2. The hub 2 as shown is a relatively thin tubular member of a slightly greater length than the cross sectional diameter of the tire although the length may be of any desired dimension depending upon the particular vehicle to which the tire and wheel will be attached. The tire 1 as shown may be conveniently made from a series of gores 3 which are joined to the adjacent gores by an overlapping seam 4. If necessary, the seam may be stitched for reinforcement in order to prevent seam separation during inflation or use of the tire 1. Depending upon the size of the particular tire being constructed in this manner, the gores may be formed of several pieces of fabric and as seen in FIG. 2. In the particular construction illustrated each gore has four fabric sections or strips 5 fabricated in the form of a sleeve or complete gore section. This particular construction forms a tire of substantially toroidal shape although it is apparent that other configurations may be used to function in a similar manner. As seen in FIG. 5, each gore 3 is formed of two pieces of fabric and as shown, joined on approximately the horizontal center line of the tire cross section. The fabric used in the construction of the tire for light weight, high strength performance, may be of square woven fabric of nylon, Dacron or other similar textile materials coated with an elastomer or plastic material to make it impervious to the particular inflating medium used in the tire.

Figure 3:
FIG. 3 is an enlarged fragmentary section of a portion of the tire.

As seen in FIG. 3, the air-impervious coating 6 would be on the interior of the fabric material and a heavier layer 7 of abrasion resistant material on the outer surface of the fabric to form the contact portion of the tire. The particular thickness and composition of the material used to form this contact or tread portion of the tire may be determined by the nature of the surface to which the tire will be subjected.

The particular means of forming the gores and fabricating the seams to join them together to complete the tire as well as the vulcanization is well known to those familiar with this art and no further explanation will be made. Tires of this construction with high strength materials require low inflation pressures in the range of ½ to 10 p.s.i. to provide very high load carrying properties along with high impact and deflection absorbing properties.

The wheel structure 8 on which the tire 1 is mounted and as seen in FIGS. 1 and 2 comprises the hub 2 and torque transmitting member 9 attached to the tire 1 by tension elements 10, 11, 12, 13, 14 and 15. Each of the elements 10, 11, 12, 13, 14 and 15 as shown are strand or cord-like elements of a material such as nylon, Dacron or other comparable material, although wire or other stranded or single strand material also may be used. The elements 12, 13, 10 and 15 must be for at least a part of their length pliant in nature, in other words relatively high strength, low elongation under tension but collapsible along their length under compression. Sufficient portions of elements 10 and 15 preferably should be pliant to permit tire 1 to collapse down to disc 9 when uninflated to take maximum advantage of the collapsible features of the asembly. Elements 11 and 14 may be pliant or rigid without materially affecting their function but are under tension for maximum effectiveness.

The torque transmitting member 9 is attached centrally on the hub 2 in any convenient manner such as by a weld 16 and may be of thin disc-like form of a light weight material such as aluminum or plastic. Lightening holes 17 may also be formed in the torque transmitting member 9 to further reduce the weight of the member 9. As will become apparent, the member 9, in the operative position, is always under tension so that the material need only be of sufficient strength to transmit the torque to which it is subjected. Preferably it should be of a material that is self supporting for ease of assembly.

The outer diameter of the torque transmitting member 9 is dependent upon the amount of torque that is to be transmitted through the member 9 to the tire 1 and the size desired for the collapsed tire and wheel assembly.

In order to provide lateral stability to the torque transmitting member 9 a plurality of stabilizing elements 11 and 14 extend preferably between the outer periphery of the torque transmitting member 9 and the hub 2. As previously mentioned the elements 11 and 14 may be of a pliant material and are attached by tying to equally spaced attachment clips (not shown) fastened to the torque transmitting member 9 adjacent the periphery of the torque transmitting member 9. The opposite ends of elements 11 and 14 are attached to the hub as shown at equally spaced intervals around the flange members 18 and 19 which are fixed to the hub 2. As shown for better peripheral stability, elements 11a and 11b extend from each attachment clip on the torque transmitting member to diametrically opposed points on flanges 18 and 19, thus forming a series of overlapping patterns with the apex of each V at the peripheral attachment point on the torque transmitting member. Preferably elements 11 and 14 are under equal tension, the amount of tension being determined by the degree of stability necessary in the torque transmitting member. The particular means of attaching the elements 11 and 14 to the torque transmitting member 9 and flanges 18 and 19 may be accomplished in many different manners, the particular attachment means being of no particular significance, except that it must necessarily maintain the desired tension in the elements 11 and 14.

To transmit torque from the torque transmitting member 9 to tire 1 and also fix the position of tire 1 with respect to the hub 2 and torque transmitting member 9, pliant elements 12 and 13 extending between the periphery of the torque transmitting member 9 and the inner periphery of the tire are used. As shown, the elements 12 and 13 are attached to the torque transmitting member 9 at the same approximate peripheral position as stabilizing elements 11 and 14 and extend to opposite sides of the inner periphery of the tire 1 so as to be tangent with the surface of the tire at the first point of contact of the elements 12 and 13 with the tire. The elements 12 and 13 may be either attached to the tire at this point or at some point above this on the periphery of the tire. For the purposes of this invention the point of attachment is referred to and meant to include the point of tangency of these elements with the tire although actual attachment may be effected at some point above. In order to obtain optimum torque transmission conditions, elements 12 and 14 will lie in a straight line as will elements 11 and 13. In other words, each of elements 11, 12, 13 and 14 form substantially equal angles with the axis of the hub. Torque transmitting elements 12 and 13 are under substantial tension at all times when the tire is inflated and the tire and wheel are operating under normal conditions.

Figure 4:
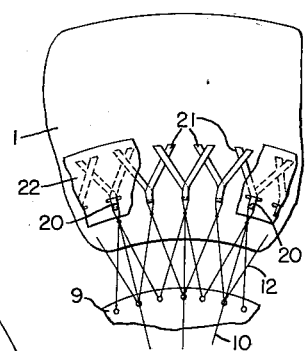
FIG. 4 is a detail view of a portion of FIG. 1.

FIG. 4 illustrates one means of attaching the elements 12 and 13 to the tire 1 in which attachment hooks or clips 20 are fastened to the tire 1 by means of a fabric strip 21 in the form of a V with the clip extending from the point of the V. A fabric strip 22 covers fabric attaching strips 21 with only clips 20 projecting through cover strip 22.

In the particular arrangement of torque transmitting elements 12 and 13 as best seen in FIGS. 1 and 4, the particular pattern of element 12 will be described with the understanding that the pattern of element 13 is identical except that it lies on the opposite side of the torque transmitting member and tire portion. Element 12a is attached to the torque transmitting member 9 at 23 and extends to and is attached to the tire at 24. A similar element 12b extends between point 24 and point 25 on the torque transmitting member. Attachment point 26 lies between attachment points 23 and 25 on the torque transmitting member from which a torque transmitting element 12c extends to attachment point 27 on the tire and another element 12d extends between point 27 and point 28. Thus, looking at the tire as shown in the plan view of FIG. 1, elements 12a and 12b form a V-shaped pattern with the vertex lying at the point of attachment to the tire. Elements 12c and 12d form a similarly positioned V overlapping the V formed by 12a and 12b. This pattern is repeated around the entire periphery of the torque transmitting member or each side thereof. The particular pattern of the torque transmitting elements 12 and 13 provides excellent peripheral stability to the tire and wheel assembly.

In order to laterally stabilize the tire 1 lateral stability elements 10 and 15 extend as shown from the attachment flanges 18 and 19 to every other point of attachment of the elements 12 and 13 on the tire side wall in the lower quadrant sections. Elements 10 and 15 are under tension when assembled but a portion of them are relieved wholly or in part of such tension when the tire is subjected to radial load. The tension under substantial lateral load is relaxed also in these elements on the side opposite to that at which the lateral load is applied. Preferably, these elements 10 and 15 are equally spaced and extend radially from the attachment flanges 18 and 19 to the tire 1.

Figure 6:
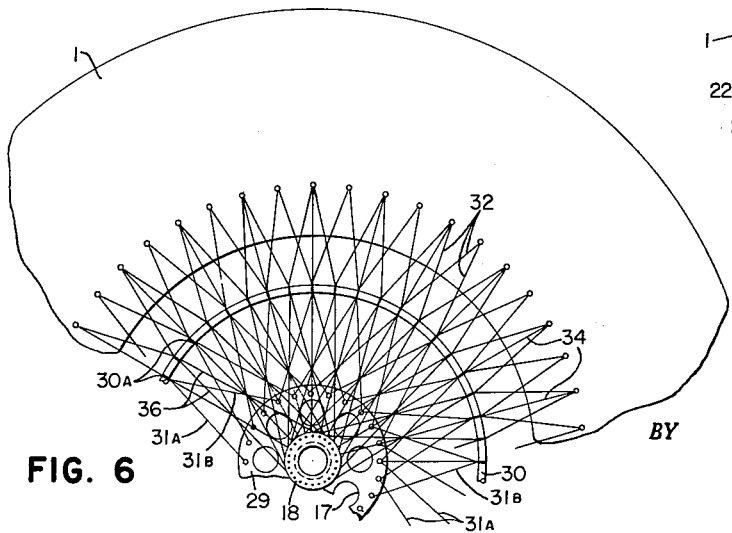
FIG. 6 is a partial plan view of a modification of the invention.
Figure 7:
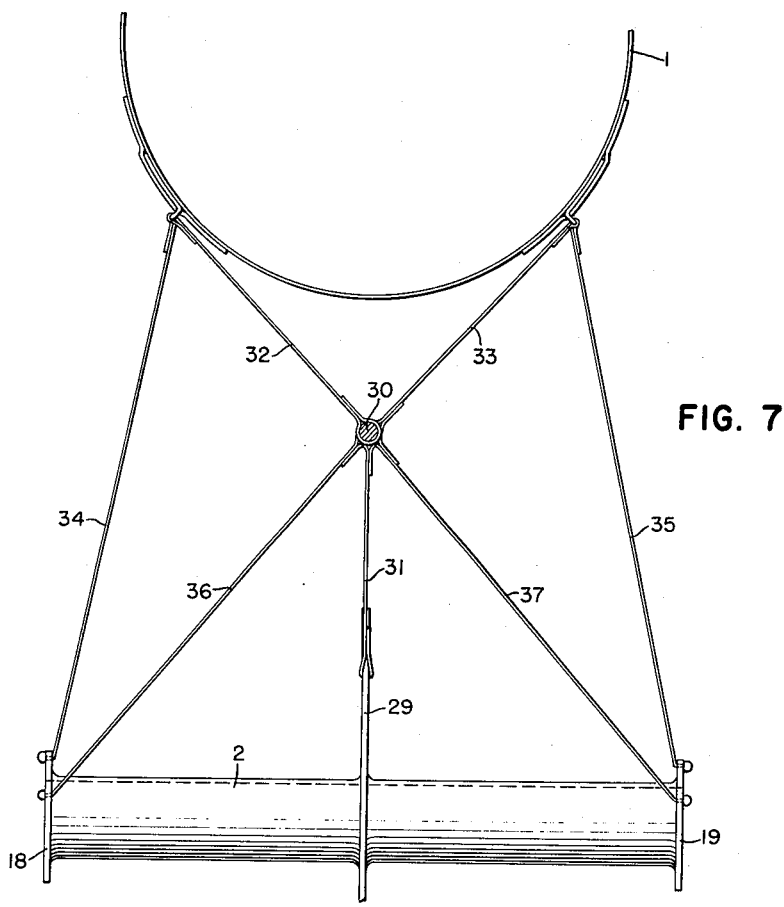
FIG. 7 is a partial section of the modification shown in FIG. 6.

In the modification of the invention illustrated in FIGS. 6 and 7, a tire and wheel assembly of substantially greater collapsibility is provided by a modified torque transmitting member. A rigid, light weight disc 29 is attached centrally to hub 1 but the outer diameter is considerably less than that of previously described disc 9 to permit tire 1 when uninflated to collapse to a much smaller package. To provide for the greater torque transmitting power than the disc 29 would provide, an endless hoop 30 of inextensible, pliant material such as rope, wire, etc is concentrically arranged around disc 29. Tie elements 31 of pliant material extend between the periphery of disc 29 and hoop 30 to position hoop 30. Preferably for maximum torque transmission tie elements 31a and 31b, from a pair of spaced points on the periphery of disc 29 are attached to hoop 30 at point 30a radially between the attachment points on disc 29. This pattern is repeated around the periphery of disc 29 and hoop 30. When the tire is inflated, tie elements 31 are under tension which maintains hoop 30 under tension and in concentric arrangement with disc 29.

Tension elements 32 and 33 of a pliant material extend between hoop 30 and tire 1 in an arrangement similar to that described for elements 12 and 13 in connection with the tire and wheel illustrated for FIG. 1. Lateral stabilizing elements 34 and 35 of a pliant material extend between flanges 18 and 19 respectively attached to hub 1 and the lower peripheral portions of tire 1. As shown elements 34 and 35 are attached to tire 1 at the same points at which elements 32 and 33 are attached. The torque transmitting member, disc 29, hoop 30 and radial ties 31 are stabilized by tension elements 36 and 37 extending between flanges 18 and 19 and the hoop 30. Preferably each of elements 31, 32, 33, 34, 35, 36 and 37 are equally spaced about the peripheries at their points of attachment to provide a balanced assembly.

Figures 8, 9:
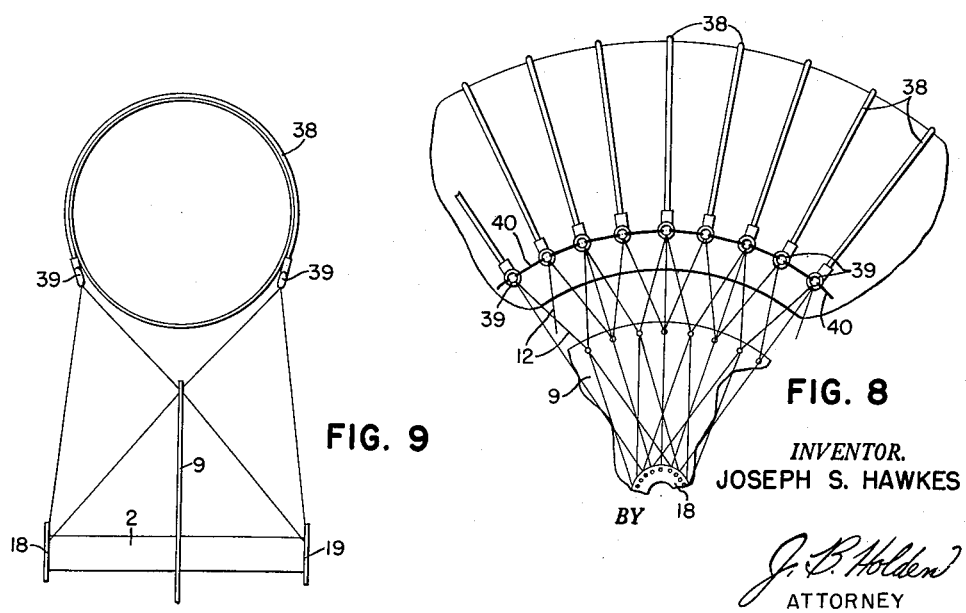
FIGS. 8 and 9 illustrate a modified tire construction.

In the modifications shown in FIGS. 8 and 9 the tire and wheel assembly as illustrated is similar to that described in connection with FIGS. 1, 2, 3 and 4. In some applications, to increase the tractive ability of the tire, traction elements 38 extending laterally around the periphery of the tire, at preferably equally spaced intervals, may be used. As shown, the grommet ends 39 may be used as a means to attach torque transmitting elements 12, 13 and the lateral stability elements 10, 15 to effectively function in the assembly. In order to maintain the grommet ends of the traction elements 38 in spaced position around the periphery of the tire a circumferential tie line 40 is attached to grommet ends 39 on each side of the tire. When tire 1 is inflated, the inflation pressure in most instances will maintain the traction elements 38 in position around the outer periphery of the tire, but one or more tie lines (not shown) may be used at portions around the surface of the tire to assist maintaining the traction elements 38 in position on the tire.

Figure 10:
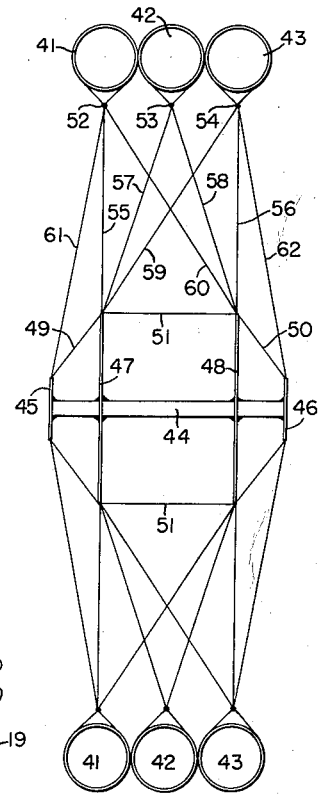
FIG. 10 is a further modification of the invention.

In the modification of the invention shown in FIG. 10 a multiple tire structure is illustrated in which three tires 41, 42 and 43 form part of the assembly. Preferably tires 41, 42 and 43 are joined to each other along the peripheral line of contact. As shown the hub 44 of a length sufficient to extend beyond the lateral limits of the tire assembly includes flanges 45 and 46 attached to each end and torque transmitting discs 47 and 48 attached to the hub 44 in spaced apart relation.

In order to provide the necessary stability to the structure, torque transmitting member stabilizing elements 49 and 50 extend from the flanges to the outer periphery of the torque transmitting discs 47 and 48 respectively with axially extending tie elements 51 extending between the torque transmitting discs 47 and 48.

Centrally positioned interiorly of each tire 41, 42 and 43 are torque transmitting hoops 52, 53 and 54 respectively, functioning in much the same manner as the hoop described in connection with the structure shown in FIGS. 6 and 7. Radially extending pliant tie elements 55 and 56 extend between hoops 52 and 54 respectively and torque transmitting discs 47 and 48. Tie elements 57 and 58 extend between hoop 53 and discs 47 and 48 respectively. Pliant tie elements 59 and 60 extend between torque transmitting discs 47 and 48 and torque transmitting hoops 54 and 52 respectively. To provide lateral stability to the assembly, elements 61 and 62 of a pliant material extend between flanges 45 and 46 and hoops 52 and 54 respectively. The arrangements of the various elements 49, 50 and 55 to 62 inclusive are preferably of a uniform pattern and in the same general arrangement as those described in connection with the previously described modifications.

In the tire and wheel assembly of any of the modifications of this invention the tire when deflated may be collapsed completely around the rigid torque transmitting discs so that the overall size of the deflated structure is considerably less than that of the inflated structure. The disc stabilizing elements extending between the hub and disc are always under tension irrespective of the condition of the tire and provide lateral stability to the discs. Each of the other elements joining the hub and the tire and the discs and either the tire or the discs and torque transmitting hoop and those joining the torque transmitting hoop and tire are subjected to substantial tension when the tire is inflated to operating pressures. This creates a very stable structure, both laterally and radially, and will carry substantial loads with high flotation characteristics. The inflation pressure may be of any desired amount being limited primarily by the strengths of the material and structural design of the tire. It has been found that inflation pressures in the range of ½ to 6 p.s.i. provide a very satisfactory tire and wheel assembly with low rolling resistance and relatively high load-carrying abilities.

In certain vehicle designs on which a tire and wheel assembly would be used, the hub length could of necessity, be less than the cross section diameter of the tire. In such instances, the lateral stability elements for both the tire and torque transmitting member may be attached to outriggers suspended from the hub or disc to provide the points of attachment at a position to attain the desired stability.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. A tire and wheel assembly comprising hub means, inflatable tire means substantially concentric with said hub means, torque transmitting means attached to said hub means and extending radially toward said tire means, means to laterally stabilize said torque transmitting means, and a plurality of pliant elements extending from each axial side and throughout the peripheral extent of said torque transmitting means to the radially inner portions of said tire means, said elements being tensioned at all times when said tire means is inflated to operating pressures and the tire and wheel assembly are operating under normal conditions.

2. A tire and wheel assembly comprising hub means, inflatable tire means substantially concentric with said hub means, torque transmitting means attached to said hub means and extending radially toward said tire means, a plurality of elements attached to said hub means at points spaced from said torque transmitting means on each side thereof and extending to said torque transmitting means adjacent the periphery thereof, and a plurality of pliant elements extending from each axial side and throughout the peripheral extent of said torque transmitting means to the radially inner portions of said tire means, said elements being tensioned at all times when said tire means is inflated to operating pressures and the tire and wheel are operating under normal conditions.

3. A tire and wheel assembly as claimed in claim 2 including a plurality of lateral stabilizing elements comprising members extending between said hub means and said tire means from points on said hub spaced from and on each side of said torque transmitting means to points on each of the radially inner portions of said tire means, said members being pliant at least in the portions adjacent said tire means.

4. A tire and wheel assembly as claimed in claim 2 in which said elements extending between said hub means and said torque transmitting means and said elements between said torque transmitting means and said tire means are at substantially the same angle with respect to the axis of the tire and wheel assembly.

5. A tire and wheel assembly as claimed in claim 2 in which said elements between said hub and said torque transmitting means are substantially equally spaced and in substantially equal numbers on each side thereof and said elements extending between said torque transmitting means and said tire means are substantially equally spaced and substantially equal in number with respect to each side of the radially inner portion of said tire means.

6. A high load carrying and high flotation tire and wheel combination comprising an axially extending hub, a flexible air retaining annular tire surrounding said hub so as to be substantially concentric and centrally positioned therearound, means fixed to said hub to transmit torque to the tire, a first group of elements attached to said hub at a distance from said torque transmitting means and extending to and attached to the torque transmitting means, a second group of elements similarly extending between the hub and the torque transmitting means on the opposite side thereof, and a group of pliant elements extending between and attached to said torque transmitting means and tire, each of said elements being tensioned at all times when the tire is inflated to operating pressures and the tire and wheel are operating under normal conditions.

7. A tire and wheel combination as claimed in claim 6 including a plurality of lateral stabilizing elements comprising members extending between said hub and said tire from points spaced about said hub on each side of and at a distance from said torque transmitting means to points spaced about and on each of the radially inner quadrants of said tire, said members being pliant at least in the portion adjacent said tire.

8. A high load carrying tire and wheel combination comprising an axially extending hub, a torque transmitting member fixed to said hub and extending radially therefrom, a flexible air retaining annular tire surrounding said torque transmitting member so as to be substantially concentric and centrally positioned therearound, the inner diameter of said tire being greater than the diameter of said torque transmitting member to provide spacing therebetween, a first group of pliant elements extending between and attached to said hub at a distance from said torque transmitting member and to the torque transmitting member at a distance from the hub, the points of attachment to the hub and the torque transmitting member being substantially equally spaced around the respective peripheries, a second group of pliant elements similarly extending between the hub and torque transmitting member on the opposite axial side thereof and a third group of pliant elements extending between and attached to the torque transmitting member and to the tire in the opposed radially inner quadrants of said tire section, each of said pliant elements being tensioned at all times when the tire is inflated to operating pressures and the tire and wheel are operating under normal conditions.

9. A high load carrying tire and wheel combination comprising an axially extending hub, a torque transmitting member fixed to said hub and extending radially therefrom, a flexible air retaining annular tire surrounding said torque transmitting member so as to be substantially concentric and centrally positioned therearound, the inner diameter of said tire being greater than the diameter of said torque transmitting member to provide spacing therebetween, a first group of pliant elements extending between and attached to said hub at a distance from said torque transmitting member and to the torque transmitting member at a distance from the hub, the points of attachment to the hub and the torque transmitting member being substantially equally spaced around the respective peripheries thereof, a second group of pliant elements similarly extending between the hub and the torque transmitting member on the opposite axial side thereof, a third group of pliant elements extending between and attached to the outer periphery of the torque transmitting member and radially inner quadrants of said tire section, and a plurality of lateral stabilizing elements consisting of two groups of pliant members extending between and attached to said hub at a distance from said torque transmitting member and to the tire in the radially inner quadrant of said tire section on the same side of said torque transmitting member, one group being oppositely disposed to the other with respect to said torque transmitting member, each of said pliant elements and lateral stabilizing elements being tensioned at all times when the tire is inflated to operating pressures when the tire and wheel are operating under normal conditions.

10. A high flotation, light weight, high load carrying and collapsible annular tire and wheel assembly in which the tire in the collapsible condition is positioned around the rigid member of the wheel assembly to substantially reduce the space occupied by the assembly while inoperative, said assembly comprising an axially extending rigid hub, a rigid torque transmitting disc fixed to said hub and extending radially therefrom, a flexible, collapsible annular tire surrounding and centrally positioned about said torque transmitting disc, the inner diameter of said tire being greater than the outer diameter of said torque transmitting member, a plurality of equally spaced disc stabilizers attached to and extending between one side of the outer periphery of said disc and said hub at a point axially spaced from the torque transmitting disc with substantially the same number stabilizers extending between the disc and hub to attachment points on the hub on opposite axial sides of said disc, a plurality of equally spaced pliant torque transmitting elements attached adjacent the outer periphery of said disc and extending to the opposed radially inner quadrants of said tire, said pliant elements first engaging said tire section at a tangency point and attached at said point or beyond, the stabilizers and torque transmitting elements being at substantially the same angle with respect to the axis of the tire and wheel assembly, and a plurality of pliant lateral stability elements attached to said hub on each side of said torque disc at a point axially spaced therefrom and extending to and attached to said tire in the radially inner quadrants on the respective sides of the torque disc, the disc stabilizers, pliant torque transmitting elements and lateral stability elements being under substantial tension at all times when the tire is inflated to operating pressures and the assembly is under normal operating conditions.

11. A tire and wheel assembly as claimed in claim 10 in which the disc stabilizers are pliant.

References Cited in the file of this patent

UNITED STATES PATENTS

| | | |
|---|---|---|
| 552,984 | Broers | Jan. 14, 1896 |
| 2,709,982 | Straussler | June 7, 1955 |
| 2,843,171 | Howe | July 15, 1958 |

FOREIGN PATENTS

| | | |
|---|---|---|
| 2,189 | Great Britain | of 1891 |
| 656,169 | France | Dec. 24, 1928 |
| 759,551 | France | Nov. 23, 1933 |
| 490,625 | Italy | Feb. 13, 1954 |